Dec. 28, 1954     T. V. MOORE ET AL     2,697,941
DETERMINING ZONES OF FLUID FLOW IN A WELL BORE
Filed Sept. 14, 1950
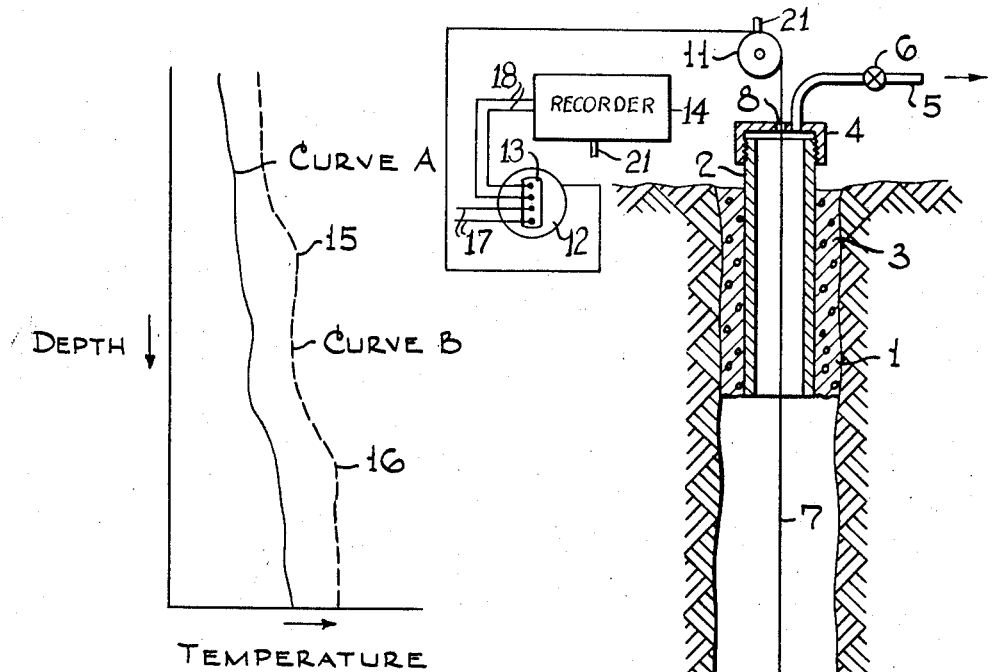
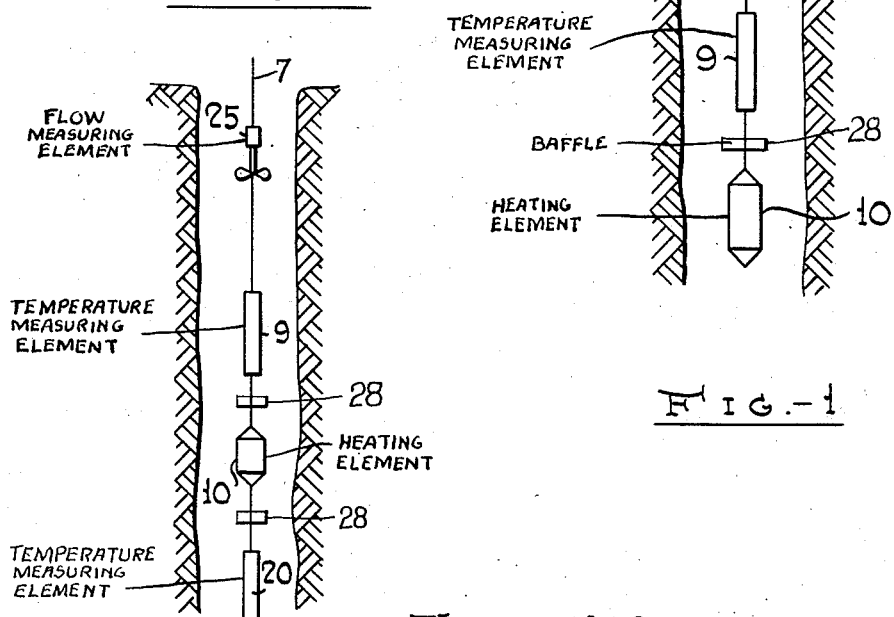
Thomas V. Moore
Robert R. Thompson    Inventors
By W. O. Heilman   Attorney

United States Patent Office 2,697,941
Patented Dec. 28, 1954

2,697,941

DETERMINING ZONES OF FLUID FLOW IN A WELL BORE

Thomas V. Moore, Manhasset, N. Y., and Robert R. Thompson, Tulsa, Okla., assignors to Standard Oil Development Company, a corporation of Delaware Application September 14, 1950, Serial No. 184,754

3 Claims. (Cl. 73—155)

This invention concerns a novel method to provide information as to the points of entry, or exit, of fluid to or from a well bore. The apparatus of this invention in the simplest form comprises a cable to be lowered into a well bore, supporting a temperature measuring element, and, displaced therefrom, a heating element. By lowering this apparatus down a bore hole in a first step of the operation in which the heater is not operated, and by then lowering the apparatus down the bore in a second step of the operation while the heater is operated, information is obtained as to fluid flow entering or leaving the well bore at points along the well. In a preferred embodiment of the invention, a flow-volume indicator is employed in combination with the indicated apparatus, providing additional information permitting the identification of the fluid flow at points in the well as an oil-gas flow or an oil-water flow.

In the production of oil from a suitable producing well, it is frequently desirable to ascertain exactly where, and at how many points along the well, fluid may be entering the well. Equally valuable is information as to whether flow at a particular point is oil, gas, or water. This is desirable, for example, to permit locating and plugging zones in the well where water rather than oil may enter. Again, in the case of a well bore which has been cased, it is often necessary to determine leaks in the casing. For these and other purposes, the method of this invention is provided. While, as indicated, the primary object is to determine points of the well at which fluid enters, or leaves the well, as will be apparent, this invention has other applications such as locating leaks in well tubing or casing, etc.

In accordance with this invention conditions in a well are controlled so as to maintain a constant rate of fluid flow into or from the well. For example, if the well is a producing well and it is desired to learn points of fluid entry into the well, flow of the fluid from the well will be controlled so as to permit a constant and slow flow of fluid from the well—for example, about 1 to 20 barrels per hour. A temperature recording or indicating element is then lowered into the well and is either periodically maintained at different levels of the well, or is continuously and slowly lowered down the well. The temperature measuring element may be chosen from those commercially available of a nature to provide a continuous record of temperature in the well bore. Thus, the instrument may be of such a nature as to record the temperature on a chart provided in the down-the-hole portion of the apparatus. For example, a metallic helix provided with a recording pen may be employed for this purpose. Alternatively, and preferably, a temperature measuring element, such as a resistance thermometer is employed, adapted to transmit electrical information to the surface of the earth which may there be recorded to indicate temperatures encountered in the well bore. The temperature information is, therefore, recorded and plotted so as to display the variations and changes in temperature with depth as the apparatus is lowered into the well. When this has been accomplished the apparatus is withdrawn and a heating element is provided below the temperature measuring means at a point somewhat displaced therefrom. Upon then lowering this apparatus down the well bore in the same manner as was first conducted, a second temperature-depth plot may be prepared, showing the variation of temperature in the well bore with depth, while a given amount of heat is supplied to the well fluids by the heater. Since the temperature recorded by the temperature measuring means will be a function of the amount of fluid passing the heating element prior to contacting the temperature measuring means, it is thus possible to determine variations in the quantity of fluid flow at different points in the well. For example, if substantially all fluid flow in the well is produced at a given zone A and little fluid flow is produced below zone A, upon lowering the temperature measuring and heating elements through and below zone A, a sharp increase in temperature will be observed. In a simple situation of this type, it may be noted that the desired information as to fluid flow may be obtained without necessity for the control run conducted with the temperature measuring element alone. However, preparation of the two curves showing the temperature depth relation with and without heater operation is a particular feature of this invention intended to determine, for example, temperature anomalies caused by expansion and cooling of gases released in the well.

In a preferred embodiment of this invention, the apparatus described is supplemented by employing, in combination therewith, a velocity of flow indicator. By employing the flow indicator to provide information as to the volume of well fluids passing the heater and temperature measuring means, it is possible to differentiate between entry of oil, gas, or water into the well.

This invention may be more fully understood by reference to the following description drawn in connection with the accompanying drawings in which:

Figure 1 diagrammatically indicates the simplest form of apparatus for practicing this invention, while:

Figure 2 illustrates a typical plot of the data obtained with the apparatus of Figure 1, and:

Figure 3 diagrammatically indicates a further embodiment of the apparatus of this invention employing thermometers both above and below the heating element, in combination with a flow velocity indicator.

Referring now to the drawings, the numeral 1 indicates a well bore from which it is assumed well fluids are produced. In practicing this invention, it is necessary that tubing in the well be removed or raised above the portion of the well to be surveyed. It is preferred that at least the upper portion of the well be provided with a casing 2 which may be cemented in the well by means of the cement 3. The casing is provided with a suitable capping element 4 provided with a fluid discharge line 5 equipped with a valve 6 to permit control of the rate at which fluid flows from the well. As indicated, in the practice of this invention, valve 6 is maintained at a suitable setting so as to permit a constant and slow flow of fluid from the well during the temperature determining operations; for example, valve 6 may be set to provide a constant flow of well fluid of about 5 barrels per hour. The apparatus illustrated is then lowered into the well on cable 7 through a suitable packing gland or stuffing box 8. The required apparatus consists of a temperature determining element 9 positioned some distance on the cable above a heating element 10. It is particularly preferred that the temperature determining means 9 consist of a resistance thermometer, or the like, capable of providing electrical signals which may be carried to the surface of the earth through electrical conductors provided in the cable 7. Cable 7 at the surface of the earth is passed over a measuring wheel 11 of conventional character to provide a continuous plot of the depth to which the apparatus has been lowered in the well. Cable 7 may be wound on a drum or reel 12 provided with suitable slip rings and sliding contacts contained within box 13 so as to establish contact between the ends of the conductors within cable 7 and recorder 14, so that the electrical signals produced by temperature measuring means 9 may be recorded. Recorder 14 is connected to the appropriate terminals of box 13 by means of conductors 18. In addition to these apparatus elements, it is necessary that means be provided to supply a suitable heating current through conductors of the cable 7 to operate the heater 10. This current may be supplied through conductors 17 from a suitable source. Suitably the recording chart within recorder 14 may be driven directly by the measuring wheel 11 through shaft or coupling 21 so its motion will be directly proportional to the depth of the apparatus in the bore hole.

In employing this apparatus, it is preferred that a first run be made in which the apparatus is lowered into the well, while the heater is inoperative. In this case, as shown in Figure 2, a temperature depth curve may be plotted showing the variation in temperature with depth under the normal conditions existent in the well. In general, as illustrated by curve A of Figure 2, such a curve will be substantially linear showing a continuous increase in the temperature of the well fluids as the depth down the well is increased. However, certain irregularities are to be expected in such a curve, due for example to introduction into the well of gases which upon expanding in the well may produce cooling effects. Again, large influx of well fluids at particular points of the well may cause curve A to be nonlinear.

A second run is then made in which all conditions are maintained the same except that the heater 10 is operated while the apparatus is lowered into the well. The particular quantity of heat supplied by heater 10 is only critical in the sense that a constant amount of heat must be supplied capable of substantially heating the fluid in the well so as to provide a readily discernible increase in the fluid temperature at the rate of flows maintained. Thus, for example, if it be assumed that a flow of 5 barrels per hour is maintained in a well bore 6 inches in diameter, and if it be assumed that the specific heat of the fluid is about 0.5 then a 500 watt heater would raise the temperature of the fluid about 2° F., in passing the heater. As it is of course necessary to measure the temperature rise resulting from the operation of the heater with reasonable accuracy, it is thus important that heater 10 be capable of providing about this increase in temperature. Consequently, while a suitable heating element 10 is operating, a second run is made to prepare a curve such as curve B shown in Figure 2. In general, as illustrated, curve B will parallel curve A, differing therefrom by a temperature equal to the heating effect on the quantity of fluid passing the heater and temperature measuring means in the well. However, at points in the well immediately below zones at which fluid flows into the well, increases in temperature will be observed such as at points 15 and 16 of curve B. These temperature fluctuations will occur since at these points in the well, as the apparatus is lowered, a decrease in the volume of fluid flow will be encountered causing the fluid to be heated to a higher temperature by the heating element.

This effect may be understood by reference to the following equation:

$$\Delta T = \frac{E}{kAV}$$

$E$ = heat supplied, B. t. u./min.
$k$ = specific heat of fluid, B. t. u./cu. ft.
$A$ = cross section of hole, sq. ft.
$V$ = velocity of flow, ft./min.

in which delta T indicates the amount of temperature rise; E equals the heat supplied, expressed in B. t. u.'s per minute; $k$ equals the specific heat of the fluid in B. t. u.'s per cubic foot; A equals the cross section of the hole in square feet, and V equals the velocity of flow in feet per minute. Referring to this equation, it will be noted that E and A in any particular run will be substantially constant and that K may also be considered to be substantially constant. Consequently, the amount of temperature rise appreciated at different points in the well will be a function of the velocity of fluid flow past the heating element and the thermometer. For this reason variations of curve B not displayed by curve A will indicate points of the well at which fluids are flowing into the well.

Referring now to Figure 3 a somewhat different embodiment of the apparatus employed is illustrated. In this embodiment, a second temperature measuring means 20 is maintained below heater 10 and temperature measuring means 9. By employing the apparatus of Figure 3, essentially the same information provided in Figure 2 may be obtained in a single run of the apparatus down the well bore. Employing the apparatus of Figure 3, temperature measuring means 20, since it is positioned below heater 10, will provide curve A shown in Figure 2. Temperature measuring means 9 by virtue of the heating effect of heater 10 will provide the information shown by curve B of Figure 2. In employing the apparatus of Figure 3, it is convenient to electrically connect temperature measuring means 9 and 20 so that the differential temperature determined by the two may be plotted. In this case a single curve of differential temperature vs. depth may be prepared essentially showing the difference in temperatures between curves A and B of Figure 2. On such a curve, variations in the temperature differential with depth will indicate points at which fluid enters the well bore.

As an optional, although preferred feature, the apparatus of Figure 3 includes a flow-volume measuring means indicated by the numeral 25. This element of the apparatus may be chosen from those known to the art of a character to develop electrical signals characteristic of the fluid flow. For example, element 25 may consist of a spinning member, actuated by the fluid flow, which will operate a small generator to provide an electrical output proportional to the volumetric flow. It is convenient to employ this type of flow indicator which develops an A. C. voltage as this voltage may be impressed on conductors of cable 7 carrying the D. C. voltage of either of the temperature measuring elements. As known, the D. C. and A. C. signals may be separately recorded at the surface of the earth.

The complete apparatus of Figure 3 therefore provides information as to the temperature increase ($\Delta T$) appreciated by operation of the heater under the flow conditions existing at different depths in the well and also gives at least an approximation of the velocity of fluid flow or the volumetric flow rate. Use of this information is indicated by the following formula:

$$\Delta T = \frac{E}{CW}$$

where E is the heat supplied by the heating element expressed in B. t. u.'s per minute, C is the specific heat of the fluid flowing past the heater expressed in B. t. u.'s per pound, W is the weight of fluid passing the heater expressed in pounds per minute and $\Delta T$ is the resultant temperature rise or the differential temperature of the two temperature measuring means of Figure 3. Assuming that the fluid passing the heater consists substantially of hydrocarbons, W may be computed since the specific heat of all hydrocarbons present in a well is approximately the same. As the apparatus described provides information as to the volume of flow, by dividing the computed weight by the volume, the apparent density of the fluid will be obtained, so as to indicate whether the hydrocarbon flow is in liquid or gas phase at particular points in the well.

The computations indicated above to distinguish between flow of oil or flow of gas into the well are of course not valid if water is simultaneously flowing into the well. It may be noted, however, that oil and gas or oil and water may be produced in a given well, but generally all three are not. In the event a particular well being surveyed is producing both oil and water, points of water production may readily be identified by comparing the $\Delta T$ information with the volume of flow information. Since the specific heat of water is approximately twice that of hydrocarbons, points of water entry will be indicated wherever decreases in $\Delta T$ are disproportionate to increases in the volume of fluid flowing.

By this means, therefore, the embodiment of the invention illustrated in Figure 3 is adapted to indicate the nature of the fluid entering the well in addition to the points of fluid entry.

The spacing of thermometer 9 from heater 10 is critical in the practice of this invention. It is necessary that elements 9 and 10 be sufficiently displaced so that normal heat diffusion through the well fluids will not affect temperature measuring means 9 under the conditions of fluid flow and at the rate at which the apparatus is lowered. For this reason elements 9 and 10 should be displaced on cable 7 by at least about 1 to 3 feet. This same limitation applies to the placement of measuring means 20 below the heating element 10. Baffles 28 may well be positioned between the heater and the temperature measuring means to minimize possible diffusion effects and to provide sufficient mixing action to eliminate any cross-sectional temperature differentials in the fluid adjacent the temperature measuring means. While, as indicated, the apparatus described may be employed by sequentially lowering the apparatus to successively lower points in the well, it is preferred that the apparatus be employed by lowering the apparatus slowly down the well at a constant rate.

It is apparent that the general process and apparatus described may be varied to secure different objectives. For example, in the case in which it is desired to determine leaks in a completely cased hole, the same general principles described may be applied. In this case operation may be conducted while exerting a constant pressure on the well hole either by maintaining a constant flow of well fluids, or by maintaining no more flow than required to keep the pressure constant.

Again, while the process has been described with reference to temperature determinations made while the apparatus is lowered in the well, it is apparent that the process may be conducted while the apparatus is raised to the surface.

What is claimed is:

1. A process for determining zones of fluid flow into and out of a well bore producing fluids which comprises the steps of controlling the flow of fluids out of the well bore at a selected constant low rate of flow, measuring and recording the temperatures existing at various depths within the well in a first vertical traverse through the well, supplying a constant known heating effect at various depths within the well during a second vertical traverse through the well, and measuring and recording the temperatures existing at various depths in the well at a fixed distance behind the point at which the said constant heating effect is supplied, whereby points of fluid entry and fluid egress along the well bore may be determined as indicated by appreciable variations in the normal temperature differential between the temperature-versus-depth plots for the two traverses at particular indicated depths within the well bore.

2. Process as defined by claim 1 including the step of simultaneously measuring and recording, during said second traverse, the rate of vertical flow of fluid within the well bore at various depths within the well at a fixed distance behind the point at which said constant heating effect is supplied, whereby the nature of the fluids flowing into and out of the well at particular depths may be determined by comparison of the measured vertical flow rates and the measured temperature differences at said particular depths within the well bore.

3. Process as defined by claim 1 wherein said first and second traverses are combined by measuring and recording the temperatures existing at various depths within the well, supplying a constant known heating effect at various depths within the well at a point behind the point of said first temperature measurement, and measuring and recording the temperatures existing at various depths in the well at a fixed distance behind the point at which the said constant heating effect is supplied.

References Cited in the file of this patent

UNITED STATES PATENTS

| Number | Name | Date |
|---|---|---|
| 2,311,757 | Jakosky | Feb. 23, 1943 |
| 2,334,920 | Gosline et al. | Nov. 23, 1943 |
| 2,342,827 | Ackers | Feb. 29, 1944 |
| 2,383,455 | Abadie | Aug. 28, 1945 |